United States Patent
Tezuka et al.

(10) Patent No.: US 8,120,688 B2
(45) Date of Patent: Feb. 21, 2012

(54) SOLID STATE IMAGING DEVICE

(75) Inventors: Yojiro Tezuka, Yokohama (JP); Hideki Yamanaka, Yokohama (JP); Eiichi Arihara, Kawasaki (JP)

(73) Assignee: Nikon Corporation, Tokyo (JP)

( * ) Notice: Subject to any disclaimer, the term of this patent is extended or adjusted under 35 U.S.C. 154(b) by 176 days.

(21) Appl. No.: 12/700,562

(22) Filed: Feb. 4, 2010

(65) Prior Publication Data

US 2010/0134671 A1 Jun. 3, 2010

Related U.S. Application Data

(63) Continuation of application No. PCT/JP2008/001955, filed on Jul. 22, 2008.

(30) Foreign Application Priority Data

Aug. 8, 2007 (JP) ................................. 2007-207169

(51) Int. Cl.
H04N 5/335 (2011.01)
(52) U.S. Cl. ....................................... 348/308; 348/243
(58) Field of Classification Search .................. 348/294, 348/308, 243; 257/291, 292; 250/208.1
See application file for complete search history.

(56) References Cited

U.S. PATENT DOCUMENTS

| 5,416,516 A | 5/1995 | Kameyama et al. |
| 6,166,769 A | 12/2000 | Yonemoto et al. |
| 2001/0005227 A1 | 6/2001 | Egawa et al. |
| 2009/0046174 A1 | 2/2009 | Yoneda et al. |
| 2010/0245647 A1* | 9/2010 | Honda et al. ................... 348/308 |
| 2011/0102657 A1* | 5/2011 | Takahashi et al. ............ 348/308 |

FOREIGN PATENT DOCUMENTS

| JP | 5-260386 A | 10/1993 |
| JP | 9-284658 A | 10/1997 |
| JP | 11-004384 A | 1/1999 |
| JP | 2001-189893 A | 7/2001 |
| JP | 2004-282236 A | 10/2004 |
| JP | 2007-173953 A | 7/2007 |

* cited by examiner

Primary Examiner — Tuan Ho

(74) Attorney, Agent, or Firm — Arent Fox LLP

(57) ABSTRACT

In a solid state imaging device according to the present application, a sampling hold part samples and holds, in accordance with sampling control signals φTVN, φTVS, a dark signal and a light signal of each of vertical signal lines provided to correspond to each column of pixels, and supplies the signals being held to horizontal signal lines in accordance with a horizontal scanning signal. During predetermined intervals T21, T22 including signal sampling timings t1, t2 determined by the sampling control signals φTVN, φTVS, pulse, signals φGH, φHCLK1, φHCLK2, φRSTH that relate in reading the signals supplied from the sampling hold part to the horizontal signal lines are stopped. Accordingly, an influence of noise when the signals corresponding to the signals of the vertical signal lines are sampled by the sampling hold part is reduced, resulting in that an image quality of a captured image is further increased.

9 Claims, 6 Drawing Sheets

SOLID STATE IMAGING DEVICE

CROSS REFERENCE TO THE RELATED APPLICATIONS

This application is a continuation application of International Application PCT/JP2008/001955, filed Jul. 22, 2008, designating the U.S., and claims the benefit of priority from Japanese Patent Application No. 2007-207169, filed on Aug. 8, 2007, the entire contents of which are incorporated herein by reference.

BACKGROUND

1. Field

The present application relates to a solid state imaging device.

2. Description of the Related Art

In a video camera and an electronic still camera, a CCD type or amplification type solid state imaging device is used. In such a solid state imaging device, a plurality of pixels having photoelectric conversion parts are arranged in a matrix shape, and signal charges are generated in the photoelectric conversion parts of the respective pixels. In an amplification type solid state imaging device, a signal charge generated and accumulated in a photoelectric conversion part of a pixel is led to a charge-voltage conversion part such as a floating diffusion, the signal charge is converted into a voltage in the charge-voltage conversion part, and a signal corresponding to the voltage is output from the pixel by an amplifying part provided in the pixel.

A solid state imaging device of XY address type or the like being such an amplification type solid state imaging device is generally provided with a vertical signal line provided to correspond to each column of a plurality of pixels and to which output signals of the pixels of the corresponding column are supplied; a sampling hold part that samples and holds signals corresponding to signals of each of the vertical signal lines in accordance with sampling control signals, and supplies the held signals to horizontal signal lines in accordance with a horizontal scanning signal; a horizontal scanning part that supplies the horizontal scanning signal to the sampling hold part; and a horizontal drive controlling part that supplies a plurality of types of pulse signals which relate to a reading of the signals supplied from the sampling hold part to the horizontal signal lines. For instance, the sampling hold part includes: a light signal accumulating capacitor and a subtracting signal accumulating capacitor provided to correspond to each of the vertical signal lines, a light signal sampling switch that makes a light signal including light information on which photoelectric conversion is performed in the pixel accumulate in the light signal accumulating capacitor, a subtracting signal sampling switch that makes a subtracting signal (a so-called dark signal or the like) including a noise element to be subtracted from the light signal accumulate in the subtracting signal accumulating capacitor, a light signal horizontal transfer switch that supplies the light signal accumulated in the light signal accumulating capacitor to a light signal horizontal signal line in accordance with the horizontal scanning signal, and a subtracting signal horizontal transfer switch that supplies the subtracting signal accumulated in the subtracting signal accumulating capacitor to a subtracting signal horizontal signal line in accordance with the horizontal scanning signal. An example of such a solid state imaging device is disclosed in Japanese Unexamined Patent Application Publication No. Hei 9-284658.

As such a solid state imaging element, one that obtains, using a differential amplifier and the like provided in the solid state imaging element, a difference between a light signal of a light signal horizontal signal line and a subtracting signal of a subtracting signal horizontal signal line and outputs a differential signal between the signals to the outside, and one that outputs each of the light signal and the subtracting signal in a parallel manner to the outside of the solid state imaging element and obtains a difference between the both signals in an external circuit or the like, are known.

Further, in such a conventional solid state imaging device, the horizontal scanning part is generally formed by using a shift register and the like, and generates the horizontal scanning signal by using a driving clock signal, a start pulse signal, and the like supplied from a drive controlling part having a timing generator and the like. The driving clock signal and the like are supplied to the horizontal scanning part during not only a horizontal scanning interval but also a horizontal blanking interval.

With the use of such a conventional solid state imaging device, the difference between the light signal and the subtracting signal can be obtained, so that a noise such as so-called fixed pattern noise is removed, resulting in that an image quality of a captured image is increased.

However, it has been proved as a result of studies undertaken by the present inventors that in the conventional solid state imaging device, when the signals corresponding to the signals of the vertical signal lines are sampled by the sampling hold part, levels of the signals are varied by an influence of noise that cannot be removed by the difference, which decreases the image quality of the captured image.

SUMMARY

The present embodiment has been made in view of such circumstances, and a proposition thereof is to provide a solid state imaging device capable of further increasing an image quality of a captured image by reducing an influence of noise when signals corresponding to signals of vertical signal lines are sampled by a sampling hold part.

In order to solve the aforementioned problems, a solid state imaging device according to a first aspect of the present embodiment includes a plurality of pixels being arranged two-dimensionally and performing a photoelectric conversion on an incident light; vertical signal lines provided to correspond to each column of the plurality of pixels and to which output signals of the pixels of the column corresponding thereto are supplied; a sampling hold part that samples and holds signals corresponding to signals of each of the vertical signal lines in accordance with sampling control signals, and supplies the signals being held to horizontal signal lines in accordance with a horizontal scanning signal; a horizontal scanning part that supplies the horizontal scanning signal to the sampling hold part; and a horizontal drive controlling part that supplies a plurality of types of pulse signals which relate in reading the signals supplied from the sampling hold part to the horizontal signal lines, in which the horizontal drive controlling part stops one or more types of pulse signals among the plurality of types of the pulse signals during predetermined intervals including signal sampling timings which are determined by the sampling control signals. Here, to stop the pulse signal means to fix the signal to high level or low level.

The solid state imaging device according to a second aspect of the present embodiment corresponds to the solid state imaging device according to the first aspect in which the predetermined intervals correspond to local intervals in the vicinity of the signal sampling timings within a horizontal blanking interval.

The solid state imaging device according to a third aspect of the present embodiment corresponds to the solid state imaging device according to the first aspect in which the predetermined intervals correspond to an entire or a large part of a horizontal blanking interval.

The solid state imaging device according to a fourth aspect of the present embodiment corresponds to the solid state imaging device according to any one of the first to third aspects in which one or more types of the pulse signals include at least one type of pulse signal that is supplied to the horizontal scanning part to make the horizontal scanning part generate the horizontal scanning signal.

The solid state imaging device according to a fifth aspect of the present embodiment corresponds to the solid state imaging device according to the fourth aspect in which the horizontal scanning part includes a shift register part, and at least one type of the pulse signal includes driving clock signals that drives the shift register part.

The solid state imaging device according to a sixth aspect of the present embodiment corresponds to the solid state imaging device according to the fourth or fifth aspect in which the horizontal scanning part includes a shift register part and a gate part that generates the horizontal scanning signal by gating output signals of respective stages of the shift register part in accordance with a gate control signal, and at least one type of the pulse signal includes the gate control signal.

The solid state imaging device according to a seventh aspect of the present embodiment corresponds to the solid state imaging device according to any one of the first to sixth aspects that further includes a horizontal signal line reset part that resets the horizontal signal lines to have a predetermined voltage in accordance with a horizontal line reset control signal, in which one or more types of the pulse signals include the horizontal line reset control signal.

The solid state imaging device according to an eighth aspect of the present embodiment corresponds to the solid state imaging device according to any one of the first to seventh aspects in which each of the pixels includes one or more of switches that operate in accordance with pixel control signals, the solid state imaging device further includes a control unit that supplies the pixel control signals to one or more of the switches, in which the control unit stops the pixel control signals during the local intervals in the vicinity of the signal sampling timings within the horizontal blanking interval. Here, to stop the pixel control signal means to fix the signal to high level or low level.

The solid state imaging device according to a ninth aspect of the present embodiment corresponds to the solid state imaging device according to any one of the first to eighth aspects in which the sampling hold part has a light signal accumulating capacitor provided to correspond to each of the vertical signal lines and in which a light signal including light information on which the photoelectric conversion is performed in the pixel is accumulated, and a subtracting signal accumulating capacitor provided to correspond to each of the vertical signal lines and in which a subtracting signal including a noise element to be subtracted from the light signal is accumulated.

According to the present embodiment, it is possible to provide a solid state imaging device capable of further increasing an image quality of a captured image by reducing an influence of noise when signals corresponding to signals of vertical signal lines are sampled by a sampling hold part.

DETAILED DESCRIPTION OF THE EMBODIMENTS

Hereinafter, a solid state imaging device according to the present invention will be described with reference to the drawings.

First Embodiment

Figure 1:
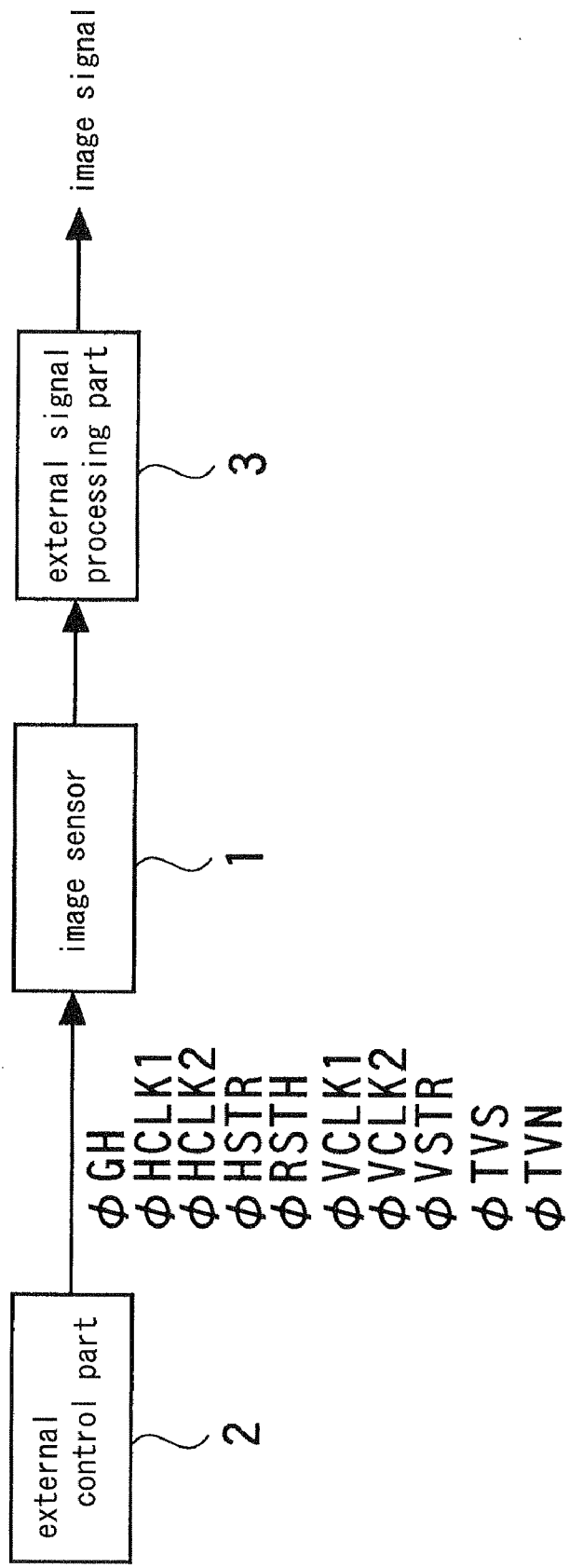
FIG. 1 is a schematic block diagram showing a solid state imaging device according to a first embodiment.

FIG. 1 is a schematic block diagram showing a solid state imaging device according to a first embodiment of the present invention. As shown in FIG. 1, the solid state imaging device according to the present embodiment includes: an image sensor (solid state imaging element) 1; an external control part 2 including a so-called timing generator (not shown) and controlling the image sensor 1 by supplying later-described control signals φGH, φHCLK1, φHCLK2, φHSTR, φRSTH, φVCLK1, φVCLK2, φVSTR, φTVS, φTVN, and the like to a vertical scanning circuit 12 (refer to FIG. 2), a horizontal scanning circuit 13 (refer to FIG. 2), and the like of the image sensor 1; and an external signal processing part 3 obtaining an image signal by processing a signal obtained from the image sensor 1.

Figure 2:
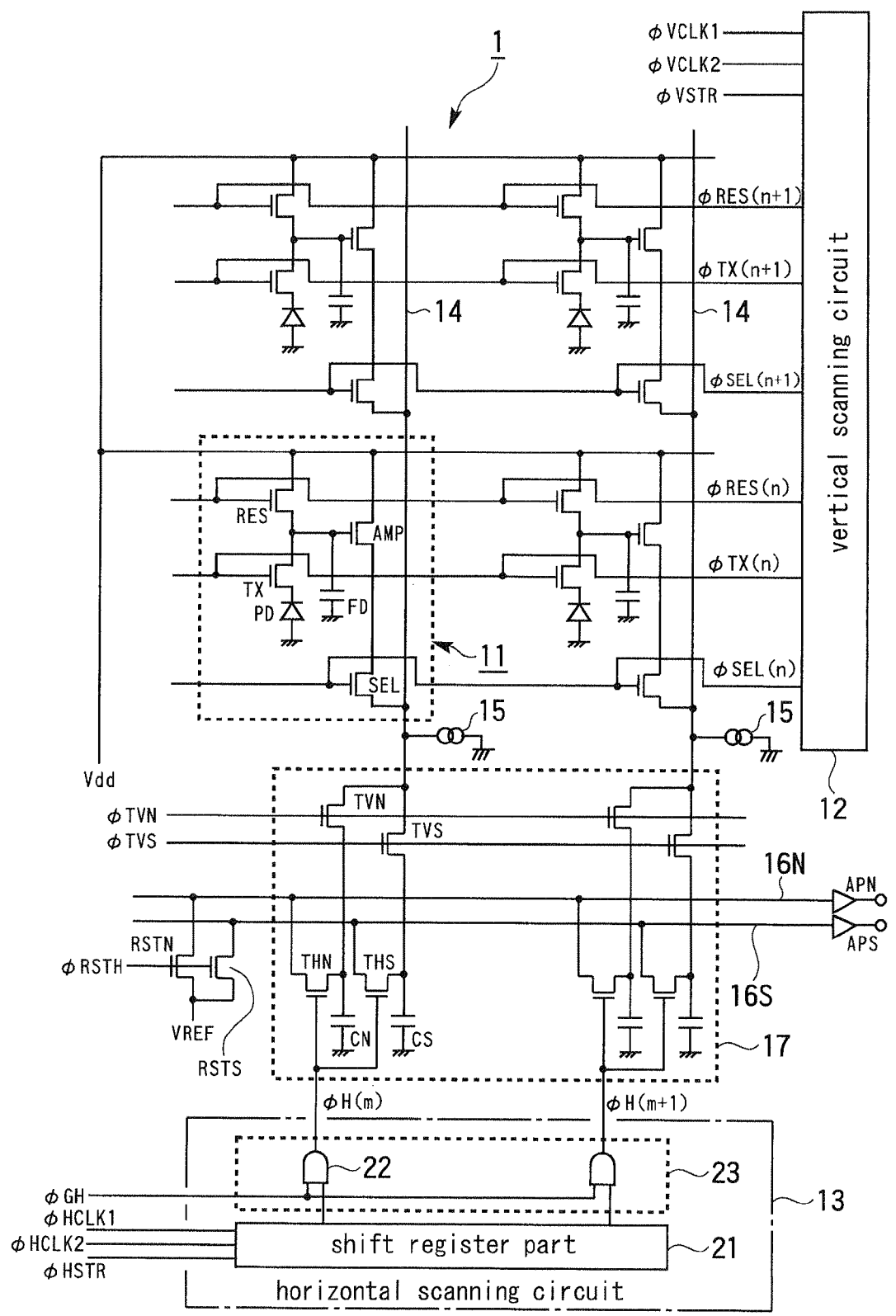
FIG. 2 is a circuit diagram showing an image sensor 1 in FIG. 1.

FIG. 2 is a circuit diagram showing the image sensor 1 in FIG. 1. The image sensor 1 is formed as a CMOS type solid state imaging element.

Similar to a general CMOS type solid state imaging element, the image sensor 1 includes: a plurality of two-dimensionally arranged pixels 11 (only 2×2 pixels 11 are shown in FIG. 2); the vertical scanning circuit (vertical scanning part) 12; the horizontal scanning circuit (horizontal scanning part) 13; a vertical signal line 14 provided to correspond to each column of the pixels 11 and to which output signals of the pixels 11 of the corresponding column are supplied; and a constant current source 15 coupled to each of the vertical signal lines 14, as shown in FIG. 2. Note that it is needless to say that the number of pixels 11 is not limited.

Similar to the general CMOS type solid state imaging element, each of the pixels 11 includes: a photodiode PD as a photoelectric conversion part that generates and accumulates a signal charge corresponding to incident light; a floating diffusion FD as a charge-voltage conversion part that receives the signal charge and converts the signal charge into a voltage; an amplifier transistor AMP as an amplifying part that outputs a signal corresponding to an electric potential of the floating diffusion FD; a transfer transistor TX as a charge transfer switch that transfers a charge from the photodiode PD to the floating diffusion FD; a reset transistor RES as a reset switch that resets the electric potential of the floating diffusion FD; and a selection transistor SEL as a selection switch for selecting the pixel 11, which are coupled as shown in FIG. 2. Note that in the present embodiment, all of the transistors AMP, TX, RES, SEL of the pixel 11 are nMOS transistors. In FIG. 2, Vdd indicates a power supply voltage.

A gate of the transfer transistor TX is coupled, for each row, to a control line with which a pixel control signal φTX for controlling the transfer transistor TX is supplied from the vertical scanning circuit 12 to the transfer transistor TX. A gate of the reset transistor RES is coupled, for each row, to a control line with which a pixel control signal φRES for controlling the reset transistor RES is supplied from the vertical scanning circuit 12 to the reset transistor RES. A gate of the selection transistor SEL is coupled, for each row, to a control line with which a pixel control signal φSEL for controlling the selection transistor SEL is supplied from the vertical scanning circuit 12 to the selection transistor SEL.

The photodiode PD generates a signal charge corresponding to a light amount of incident light (subject light). The transfer transistor TX is turned on during a high level interval of transfer pulse (pixel control signal) φTX, and transfers the signal charge accumulated in the photodiode PD to the floating diffusion FD. The reset transistor RES is turned on during a high level interval of reset pulse (pixel control signal) φRES, and resets the floating diffusion FD.

The amplifier transistor AMP has a drain coupled to the power supply voltage Vdd, a gate coupled to the floating diffusion FD, and a source coupled to a drain of the selection transistor SEL, and forms a source follower circuit in which the constant current source 15 is used as a load. The amplifier transistor AMP outputs a read current corresponding to a voltage value of the floating diffusion FD to the vertical signal line 14 via the selection transistor SEL. The selection transistor SEL is turned on during a high level interval of selection pulse (pixel control signal) φSEL, and couples the source of the amplifier transistor AMP to the vertical signal line 14.

The vertical scanning circuit 12 is formed by using a shift register part (not shown) and the like, and outputs, to each row of the pixels 11, the selection pulse φSEL, the reset pulse φRES, and the transfer pulse φTX, respectively, after receiving, from the external control part 2, two-phase vertical driving clock signals φVCLK1, φVCLK2, and a vertical start pulse signal φVSTR being vertical drive control signals each formed of a pulse signal.

After receiving, from the external control part 2, horizontal drive control signals φGH, φHCLK1, φHCLK2, φHSTR each formed of a pulse signal, the horizontal scanning circuit 13 outputs a horizontal scanning signal φH to each column. In the present embodiment, the horizontal scanning circuit 13 includes a shift register part 21 that is driven by receiving two-phase horizontal driving clock signals φHCLK1, φHCLK2, and a horizontal start pulse signal φHSTR from the external control part 2, and a gate part 23 formed of an AND gate 22 provided to each column and generating the horizontal scanning signal φH by gating output signals of respective stages of the shift register part 21 in accordance with a gate control signal φGH from the external control part 2. One input terminals of the respective AND gates 22 are commonly coupled, and the gate control signal φGH is input to the terminals. The output signals of the respective stages of the shift register part 21 are respectively input to the other input terminals of the respective AND gates 22. The gate control signal φGH is a pulse signal for setting a pulse width and the like of the horizontal scanning signal φH. The horizontal scanning signal φH for each column is output from an output terminal of each of the AND gates 22. As understood from the above description, the horizontal drive control signals φGH, φHCLK1, φHCLK2, φHSTR are pulse signals supplied to the horizontal scanning circuit 13 to make the horizontal scanning circuit 13 generate the horizontal scanning signal φH.

Further, the image sensor 1 is provided with a sampling hold part 17 that samples and holds signals corresponding to signals of each of the vertical signal lines 14 in accordance with sampling control signals φTVN, φTVS, and supplies the held signals to horizontal signal lines 16N, 16S in accordance with the horizontal scanning signal φH. In the present embodiment, the sampling hold part 17 includes a light signal accumulating capacitor CS and a dark signal accumulating capacitor CN provided to correspond to each of the vertical signal lines 14, a light signal sampling switch TVS that makes a light signal including light information on which photoelectric conversion is performed in the pixel 11 accumulate in the light signal accumulating capacitor CS in accordance with a light signal sampling control signal φTVS, a dark signal sampling switch TVN that makes a so-called dark signal as a subtracting signal including a noise element to be subtracted from the light signal accumulate in the dark signal accumulating capacitor CN in accordance with a dark signal sampling control signal φTVN, a light signal horizontal transfer switch THS that supplies the light signal accumulated in the light signal accumulating capacitor CS to a light signal horizontal signal line 16S in accordance with the horizontal scanning signal φH, and a dark signal horizontal transfer switch THN that supplies the dark signal accumulated in the dark signal accumulating capacitor CN to a dark signal horizontal signal line 16N in accordance with the horizontal scanning signal φH. To the horizontal signal lines 16S, 16N, output amplifiers APS, APN are respectively coupled. In the present embodiment, all of the switches TVS, TVN, THS, THN are nMOS transistors.

Gates of the respective light signal sampling switches TVS are commonly coupled, and the light signal sampling control signal φTVS is supplied to the gates from the external control part 2. When the light signal sampling switch TVS is turned on in accordance with the light signal sampling control signal φTVS, the light signal of the vertical signal line 14 is accumulated in the corresponding light signal accumulating capacitor CS. Further, a level of the light signal accumulated in the light signal accumulating capacitor CS is determined based on a level of the signal of the vertical signal line 14 at the time when the light signal sampling switch TVS is turned off (specifically, a falling time of φTVS). In other words, the falling time of the light signal sampling control signal φTVS corresponds to a sampling timing of the light signal.

Gates of the respective dark signal sampling switches TVN are commonly coupled, and the dark signal sampling control signal φTVN is supplied to the gates from the external control part 2. When the dark signal sampling switch TVN is turned on in accordance with the dark signal sampling control signal φTVN, the dark signal of the vertical signal line 14 is accumulated in the corresponding dark signal accumulating capacitor CN. Further, a level of the dark signal accumulated in the dark signal accumulating capacitor CN is determined based on a level of the signal of the vertical signal line 14 at the time when the dark signal sampling switch TVN is turned off (specifically, a falling time of φTVN). In other words, the falling time of the dark signal sampling control signal φTVN corresponds to a sampling timing of the dark signal.

Gates of the light signal horizontal transfer switch THS and the dark signal horizontal transfer switch THN are commonly coupled for each column, and the horizontal scanning signal φH for the corresponding column is supplied to the gates from the horizontal scanning circuit 13. When the horizontal transfer switches THS, THN of each column are turned on in accordance with the horizontal scanning signal φH for each column, the light signal and the dark signal respectively accumulated in the light signal accumulating capacitor CS and the dark signal accumulating capacitor CN of the corresponding column are output to the light signal horizontal signal line 16S and the dark signal horizontal signal line 16N, respectively, and are output to the external signal processing part 3 in FIG. 1 via the output amplifiers APS, APN, respectively.

Further, the image sensor 1 includes horizontal line reset transistors RSTS, RSTN to reset each of the horizontal signal lines 16S, 16N to have a predetermined voltage VREF in accordance with a horizontal line reset control signal φRSTH. In the present embodiment, all of the horizontal line reset transistors RSTS, RSTN are nMOS transistors. Gates of the horizontal line reset transistors RSTS, RSTN are commonly coupled, and the horizontal line reset control signal φRSTH is supplied to the gates from the external control part 2. When the horizontal line reset transistors RSTS, RSTN are turned on in accordance with the horizontal line reset control signal φRSTH, the horizontal signal lines 16S, 16N are respectively reset to have the predetermined voltage VREF. Similar to the horizontal drive control signals φGH, φHCLK1, φHCLK2, φHSTR, the horizontal line reset control signal φRSTH is a pulse signal that relates to the reading of the signals supplied from the sampling hold part 17 to the horizontal signal lines 16S, 16N.

Although not shown in the drawing, the external signal processing part 3 obtains a difference between outputs of the output amplifiers APS, APN using a differential amplifier and the like. Accordingly, a correlated double sampling is realized, and a light information signal from which a fixed pattern noise or the like is removed can be obtained as an image signal from the external signal processing part 3.

In the present embodiment, a part, in the external control part 2, that accomplishes a function of supplying the pulse signals φGH, φHCLK1, φHCLK2, φHSTR, φRSTH which relate to the reading of the signals supplied from the sampling hold part 17 to the horizontal signal lines 16S, 16N forms a horizontal drive controlling part. In the present embodiment, the horizontal drive controlling part (namely, the external control part 2) is structured to stop the pulse signals φGH, φHCLK1, φHCLK2, φRSTH (specifically, to fix the signals to high level or low level) during predetermined intervals including signal sampling timings determined by the sampling control signals φTVN, φTVS (the falling time of φTVN and the falling time of φTVS). This point will be descried later in detail with reference to FIG. 3.

Further, in the present embodiment, a part, in the external control part 2, that accomplishes a function of supplying the pulse signals φVCLK1, φVCLK2, φVSTR, and the vertical scanning circuit 12 form a control unit that supplies the pixel control signals φTX, φRES, φSEL to the corresponding transistors (switches) TX, RES, SEL, respectively. In the present embodiment, the vertical scanning circuit 12 (namely, the control unit) stops the pixel control signals φTX, φRES, φSEL (in other words, fixes the signals to high level or low level) during local intervals in the vicinity of the signal sampling timings (the falling time of φTVN and the falling time of φTVS) within a horizontal blanking interval. This point will also be described later in detail with reference to FIG. 3.

Figure 3:
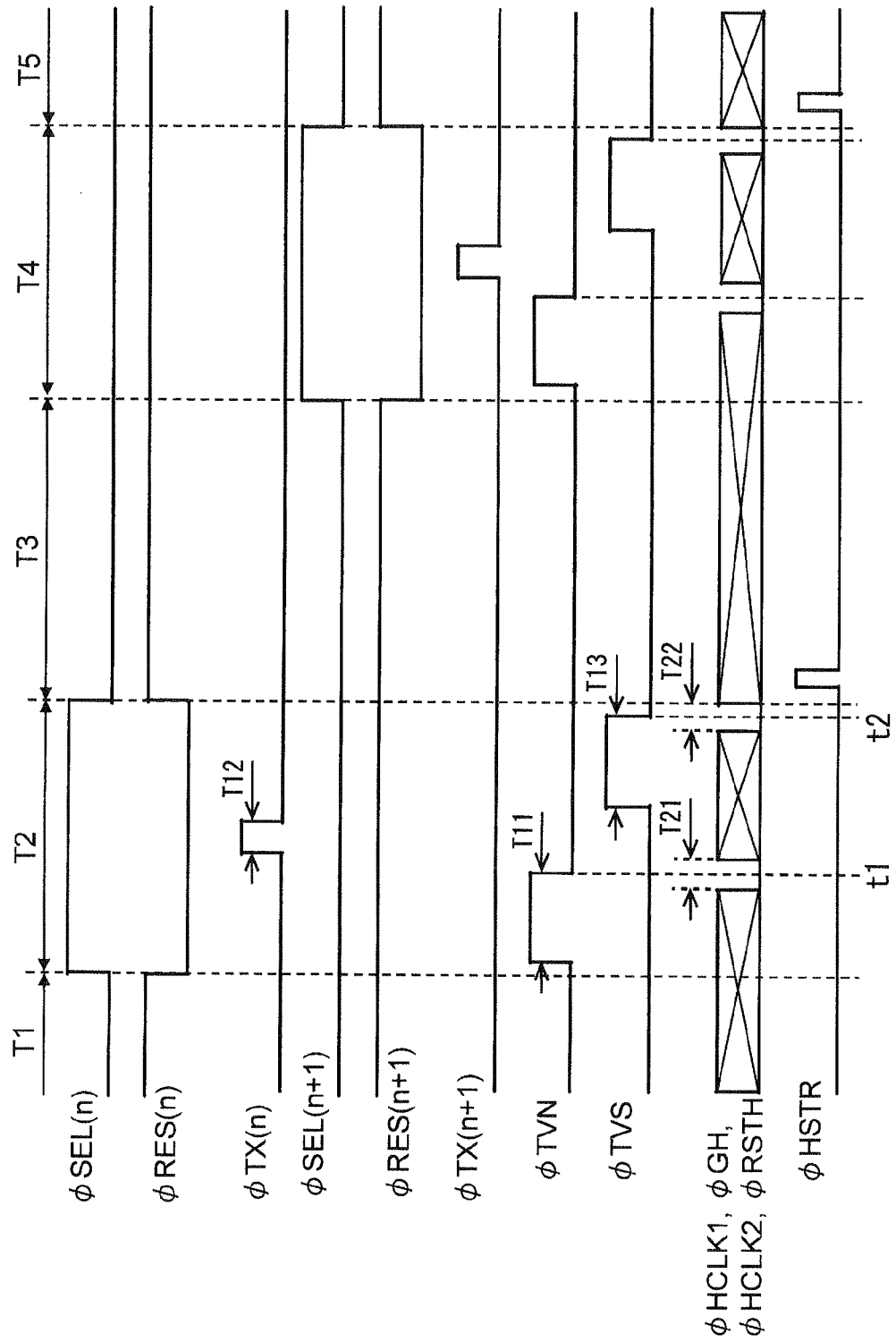
FIG. 3 is a timing chart showing an example of a read operation of the solid state imaging device according to the first embodiment.
Figure 5:
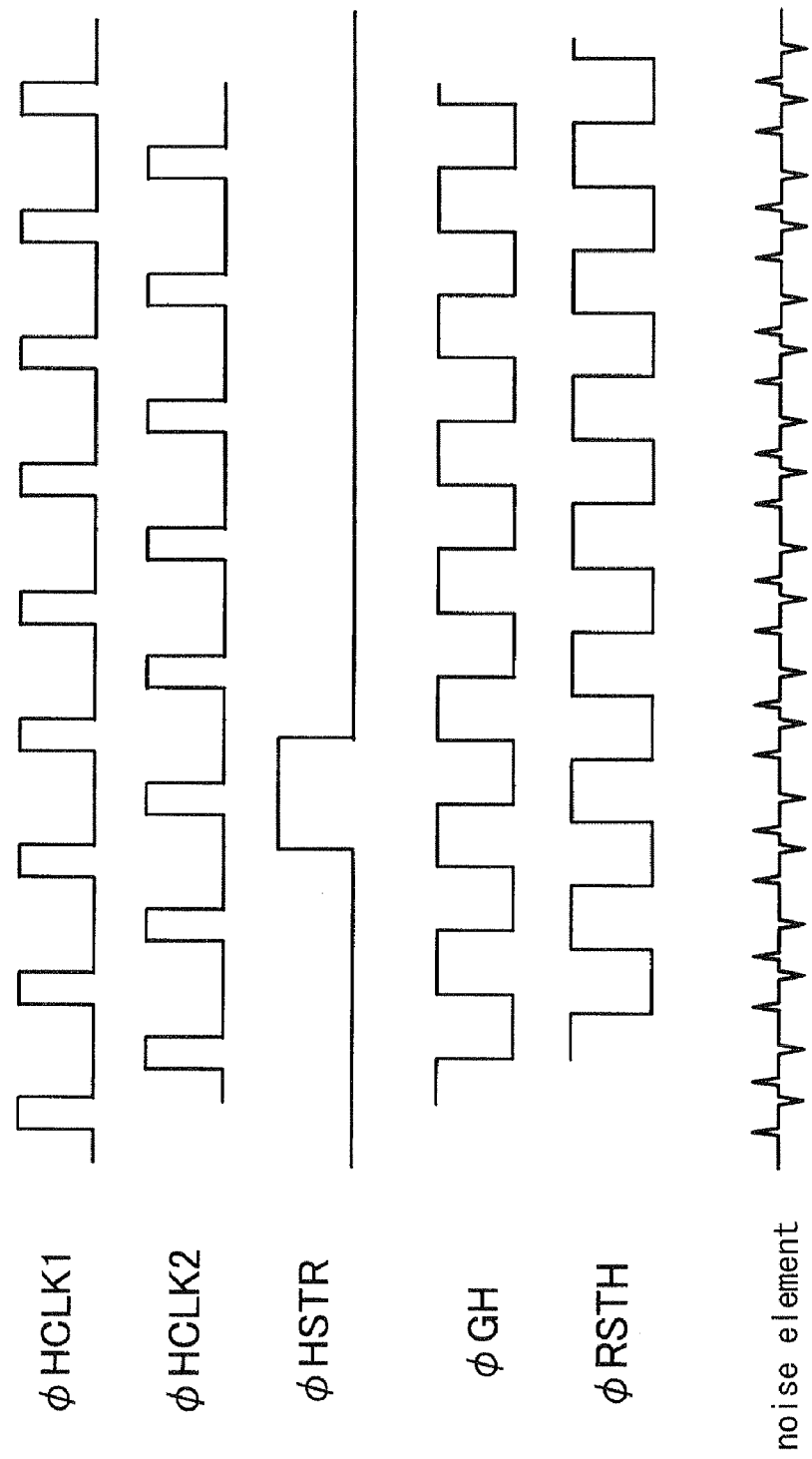
FIG. 5 is a timing chart showing, in a temporally enlarged manner, the vicinity of A portion in FIG. 4.

FIG. 3 is a timing chart showing an example of a read operation of the solid state imaging device according to the present embodiment. In FIG. 3, an interval shown by a quadrangle marked X indicates an interval during which the control signals φGH, φHCLK1, φHCLK2, φRSTH are repeated at high frequency to be generated as the pulse signals. If a part of the interval is shown in a temporally enlarged manner, these control signals φGH, φHCLK1, φHCLK2, φRSTH have the same waveform as that shown in later-described FIG. 5 during the interval. As understood from FIG. 5, these control signals φGH, φHCLK1, φHCLK2, φRSTH have the same frequency, but, pulse widths and phases thereof are set as shown in FIG. 5. Although not specifically shown in FIG. 3, during intervals other than the intervals shown by the quadrangles marked X, each of the control signals φGH, φHCLK1, φHCLK2, φRSTH is stopped and fixed to high level or low level.

In the present embodiment, a mechanical shutter (not shown) is opened by a predetermined exposure interval to store a charge in a charge storage layer of the photodiode PD of each of the pixels 11, and thereafter, each one of rows is sequentially selected on a row-by-row basis and the same operation is sequentially performed on the pixels 11 of each one of the rows. FIG. 3 mainly shows an operation when the pixels 11 of the nth row are selected and the pixels 11 of the n+1th row are successively selected.

An interval T1 is a horizontal scanning interval of outputs of the pixels 11 of the n−1th row, and corresponds to a later-described interval T3. An interval T2 after the interval T1 is a horizontal blanking interval of outputs of the pixels 11 of the nth row.

During the interval T2, the pixels 11 of the nth row are selected by the vertical scanning circuit 12, the reset pulse φRES(n) of the nth row is changed to a low level, and the reset transistors RES of the nth row are turned off. Further, during the interval T2, the selection pulse φSEL(n) of the nth row is changed to a high level, and the selection transistors SEL of the nth row are turned on. When the selection transistors SEL of the nth row are turned on, the sources of the amplifier transistors AMP of the nth row are coupled to the vertical signal lines 14. Further, the amplifier transistors AMP of the nth row are operated as source follower circuits by the constant current sources 15.

During an interval from the start of the interval T2 to the start of an interval T12, the selection transistors SEL of the nth row are turned on and the reset transistors RES of the nth row are turned off at the same time, resulting in that gate voltages of the amplifier transistors AMP of the pixels 11 of the nth row become a floating state and reset levels of the pixels 11 of the nth row appear on the vertical signal lines 14. At this time, during an interval T11 after the interval T2 is started, the dark signal sampling pulse (control signal) φTVN is changed to a high level, and the dark signal sampling switches TVN are turned on. Accordingly, the dark signals of the pixels 11 of the nth row are accumulated in the dark signal accumulating capacitors CN. This operation is performed on the pixels 11 of each column of the nth row in a simultaneous and parallel manner. Further, the level of the dark signal accumulated in the dark signal accumulating capacitor CN is determined based on the level of the signal of the vertical signal line 14 at the time when the dark signal sampling switch TVN is turned off (specifically, an end time of the interval T11 and the falling time of φTVN). In other words, the falling time of the dark signal sampling control signal φTVN (the end time of the interval T11) corresponds to a sampling timing of dark signal t1.

Next, during the interval T12 within the interval T2, the transfer pulse φTX(n) of the nth row is changed to a high level, and the transfer transistors TX of the nth row are turned on. When the transfer transistors TX of the nth row are turned on, the signal charges photoelectrically converted and accumulated in the photodiodes PD of the pixels 11 of the nth row are transferred to the corresponding floating diffusions FD. Accordingly, the voltages of the floating diffusions FD become voltages corresponding to the transferred electric charge amounts, and the voltages are applied to gate electrodes of the amplifier transistors AMP. As a result of this, the levels including the light information of the pixels 11 of the nth row appear on the vertical signal lines 14. At this time, during an interval T13 after the interval T12, the light signal sampling pulse (control signal) φTVS is changed to a high level, and the light signal sampling switches TVS are turned on. Accordingly, the light signals of the pixels 11 of the nth row are accumulated in the light signal accumulating capacitors CS. This operation is performed on the pixels 11 of each column of the nth row in a simultaneous and parallel manner. Further, the level of the light signal accumulated in the light signal accumulating capacitor CS is determined based on the level of the signal of the vertical signal line 14 at the time when the light signal sampling switch TVS is turned off (specifically, an end time of the interval T13 and the falling time of φTVS). In other words, the falling time of the light signal sampling control signal φTVS (the end time of the interval T13) corresponds to a sampling timing of light signal t2.

As described above, during the interval T2, the sampling of the output signals of the pixels 11 of the nth row is performed, and the dark signals of the pixels 11 of the nth row and the light signals of the pixels 11 of the nth row are accumulated, for each column, in the dark signal accumulating capacitors CN and the light signal accumulating capacitors CS, respectively.

An interval T3 after the interval T2 is a horizontal scanning interval of the outputs of the pixels 11 of the nth row. During the interval T3, when the horizontal scanning is performed based on the horizontal scanning signal φH from the horizontal scanning circuit 13, the dark signal horizontal transfer switches THN and the light signal horizontal transfer switches THS are sequentially turned on for each of the corresponding vertical signal lines 14, the dark signals and the light signals respectively accumulated in the accumulating capacitors CN, CS are sequentially read, for each of the corresponding vertical signal lines 14, to the dark signal horizontal signal line 16N and the light signal horizontal signal line 16S, respectively, and are output to the external signal processing part 3 via the output amplifiers APN, APS, respectively. The external signal processing part 3 obtains a difference between the outputs of the output amplifiers APS, APN using a differential amplifier and the like. Accordingly, a light information signal from which a fixed pattern noise or the like is removed can be obtained as an image signal from the external signal processing part 3.

Next, during intervals T4, T5, the same operation as that performed with respect to the nth row during the intervals T2, T3 is performed with respect to the n+1th row, and the same operation is repeated thereafter.

As shown in FIG. 3, in the present embodiment, the external control part 2 is structured to stop the pulse signals φGH, φHCLK1, φHCLK2, φRSTH (specifically, to fix the signals to high level or low level) during predetermined intervals T21, T22 including the signal sampling timings t1, t2 (the falling time of φTVN and the falling time of φTVS) determined by the sampling control signals φTVN, φTVS, and to make, during the other intervals, each of the signals repeat at high frequency so that the signal is generated as the pulse signal. In the present embodiment, the predetermined interval T21 is a local interval including the signal sampling timing t1 within the horizontal blanking interval, and the predetermined interval T22 is a local interval including the signal sampling timing t2 within the horizontal blanking interval.

According to the present embodiment, since the pulse signals φGH, φHCLK1, φHCLK2, φRSTH are stopped during the intervals T21, T22, it is possible to reduce the influence of noise when the signals corresponding to the signals of the vertical signal lines 14 (the light signal and the dark signal in the present embodiment) are sampled by the sampling hold part 17, which enables to further increase the image quality of the captured image.

Figure 4:
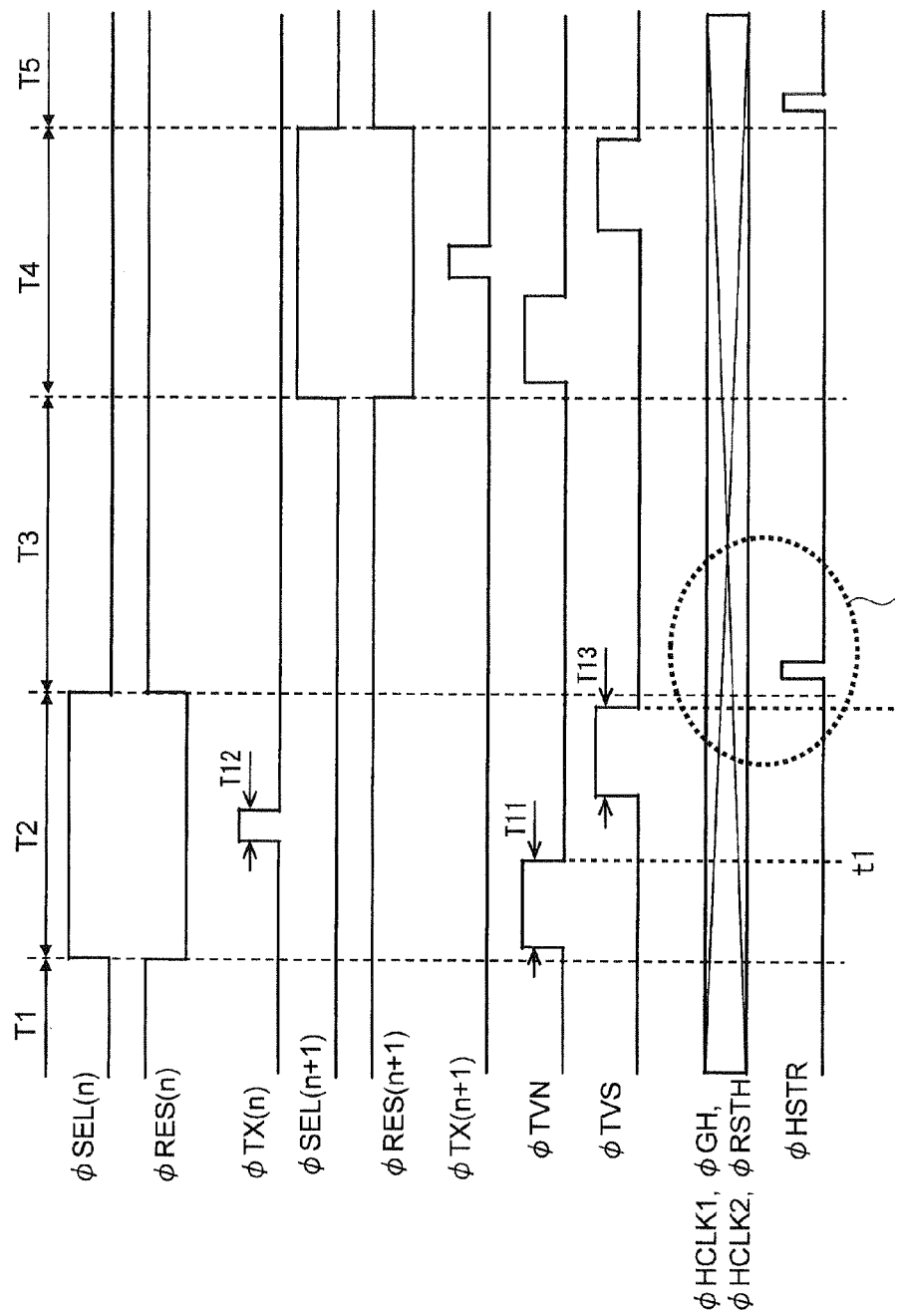
FIG. 4 is a timing chart showing a read operation of a solid state imaging device according to a comparative example.

Here, the description will be made by referring to a comparative example to be compared with the present embodiment. FIG. 4 is a timing chart showing a read operation of a solid state imaging device according to the comparative example. In FIG. 4, the same or corresponding elements as those in FIG. 3 are denoted by the same reference numerals, and an overlapping explanation thereof will be omitted. FIG. 5 is a timing chart showing, in a temporally enlarged manner, the vicinity of A portion in FIG. 4.

In the comparative example, the only point that differs from the present embodiment is that the external control part 2 is structured to make, during all the intervals, each of the pulse signals φGH, φHCLK1, φHCLK2, φRSTH repeat at high frequency so that the signal is generated as the pulse signal.

In the comparative example and the present embodiment, when each of the pulse signals φGH, φHCLK1, φHCLK2, φRSTH is repeated to be generated as the pulse signal, a noise element appears on the vertical signal line 14 and the like in the vicinity of rising and in the vicinity of falling of these signals. For easier understanding, FIG. 5 schematically shows the noise element that appears on the vertical signal line 14 and the like in the vicinity of rising and in the vicinity of falling of the pulse signals φHCLK1, φHCLK2.

Accordingly, since each of the pulse signals φGH, φHCLK1, φHCLK2, φRSTH is repeated to be generated as the pulse signal also at the signal sampling timings t1, t2 in the comparative example, the noise element ascribable to the pulse signals φGH, φHCLK1, φHCLK2, φRSTH appears on the level of the dark signal sampled at the signal sampling timing t1 and accumulated in the dark signal accumulating capacitor CN, and the noise element ascribable to the pulse signals φGH, φHCLK1, φHCLK2, φRSTH appears on the level of the light signal sampled at the signal sampling timing t2 and accumulated in the light signal accumulating capacitor CS.

Further, there is a time difference between the signal sampling timing t1 and the signal sampling timing t2, so that the amount of noise element generated at the signal sampling timing t1 and the amount of noise element generated at the signal sampling timing t2 do not become the same. Therefore, in the comparative example, even if the difference between the dark signal and the light signal is obtained, the noise element ascribable to the pulse signals φGH, φHCLK1, φHCLK2, φRSTH remains, and due to the noise element, the light information signal is deviated from the true light information signal, resulting in that the image quality of the captured image is decreased. Therefore, although the difference between the dark signal and the light signal when shooting is performed under the state where no light is incident is ideally zero, according to the comparative example, even if the shooting is performed under the state where no light is incident, the difference between the signals becomes relatively large instead of becoming zero.

Incidentally, in an example shown in FIG. 2 in the present embodiment and the comparative example, the sampling control signals φTVN, φTVS from the external control part 2 are input from the left side of FIG. 2. Accordingly, signal transmission distances of the sampling control signals φTVN, φTVS to the sampling switches TVN, TVS of the left side column become relatively short, and signal transmission distances of the signals to the sampling switches TVN, TVS of the right side column become relatively long. Accordingly, the sampling control signals φTVN, φTVS reach earlier the sampling switches TVN, TVS of the further left side column and, on the other hand, the signals reach later the sampling switches TVN, TVS of the further right side column. For this reason, the sampling switches TVN, TVS of the further left side column are turned off earlier, and the sampling switches TVN, TVS of the further right side column are turned off later. As a result of this, there is generated a time difference of the signal sampling timings t1, t2 between the sampling switches TVN, TVS of the left side column and the sampling switches TVN, TVS of the right side column. Therefore, in the comparative example, although it should be such that the amount of noise element remained in the difference between the light signal and the dark signal of the left side column and the amount of noise element remained in the difference between the light signal and the dark signal of the right side column become the same and thus the influence of noise becomes the same between the left side column and the right side column if the time difference as described above does not exist, in reality, there is generated a difference between the amount of noise element remained in the difference between the light signal and the dark signal of the left side column and the amount of noise element remained in the difference between the light signal and the dark signal of the right side column, resulting in that the influence of noise becomes different between the left side column and the right side column. Due to the above, the image quality of the captured pixel is further decreased in the comparative example.

On the contrary, in the present embodiment, the pulse signals φGH, φHCLK1, φHCLK2, φRSTH are stopped during the predetermined intervals T21, T22 including the signal sampling timings t1, t2 determined by the sampling control signals φTVN, φTVS, so that the noise element ascribable to the pulse signals φGH, φHCLK1, φHCLK2, φRSTH does not appear on the level of the dark signal sampled at the signal sampling timing t1 and accumulated in the dark signal accumulating capacitor CN, and the noise element ascribable to the pulse signals φGH, φHCLK1, φHCLK2, φRSTH does not appear on the level of the light signal sampled at the signal sampling timing t2 and accumulated in the light signal accumulating capacitor CS. Accordingly, in the present embodiment, the noise element ascribable to the pulse signals φGH, φHCLK1, φHCLK2, φRSTH does not remain in the difference between the dark signal and the light signal, resulting in that the image quality of the captured image is increased. Therefore, according to the present embodiment, it is possible to approach an ideal situation where the difference between the dark signal and the light signal when shooting is performed under the state where no light is incident is ideally zero.

Further, also in the present embodiment, there is generated a time difference of the signal sampling timings t1, t2 between the sampling switches TVN, TVS of the left side column and the sampling switches TVN, TVS of the right side column as described above. However, in the present embodiment, no noise element ascribable to the pulse signals φGH, φHCLK1, φHCLK2, φRSTH remains in the difference between the dark signal and the light signal, which enables to avoid a situation in which the difference between the amount of noise element remained in the difference between the light signal and the dark signal of the left side column and the amount of noise element remained in the difference between the light signal and the dark signal of the right side column is generated, and also from this point, the image quality of the captured pixel is increased.

Note that it is preferable to set the lengths of the intervals T21, T22, in particular, the length of interval from the end time of the interval T11 to an end time of the interval T21, and the length of interval from the end time of the interval T13 to an end time of the interval T22, by taking into consideration the time difference of the signal sampling timings t1, t2 generated between the sampling switches TVN, TVS of the left side column and the sampling switches TVN, TVS of the right side column. Specifically, it is preferable to set the length of interval from the end time of the interval T11 to the end time of the interval T21 and the length of interval from the end time of the interval T13 to the end time of the interval T22 to be longer than an interval from when the sampling switches TVN, TVS of either column to be turned off first are turned off to when the sampling switches TVN, TVS of either column to be turned off last are turned off. It is preferable to set the lengths as described above since the noise element ascribable to the pulse signals φGH, φHCLK1, φHCLK2, φRSTH does not remain in the difference between the dark signal and the light signal in each column.

Further, in the present embodiment, each of the pixel control signals φTX, φRES, φSEL is stopped during the aforementioned intervals T21, T22. Therefore, according to the present embodiment, the noise element ascribable to the pixel control signals φTX, φRES, φSEL does not appear on the level of the dark signal sampled at the signal sampling timing t1 and accumulated in the dark signal accumulating capacitor CN, and the noise element ascribable to the pixel control signals φTX, φRES, φSEL does not appear on the level of the light signal sampled at the signal sampling timing t2 and accumulated in the light signal accumulating capacitor CS. Therefore, also from this point, the image quality of the captured image is increased in the present embodiment.

Second Embodiment

Figure 6:
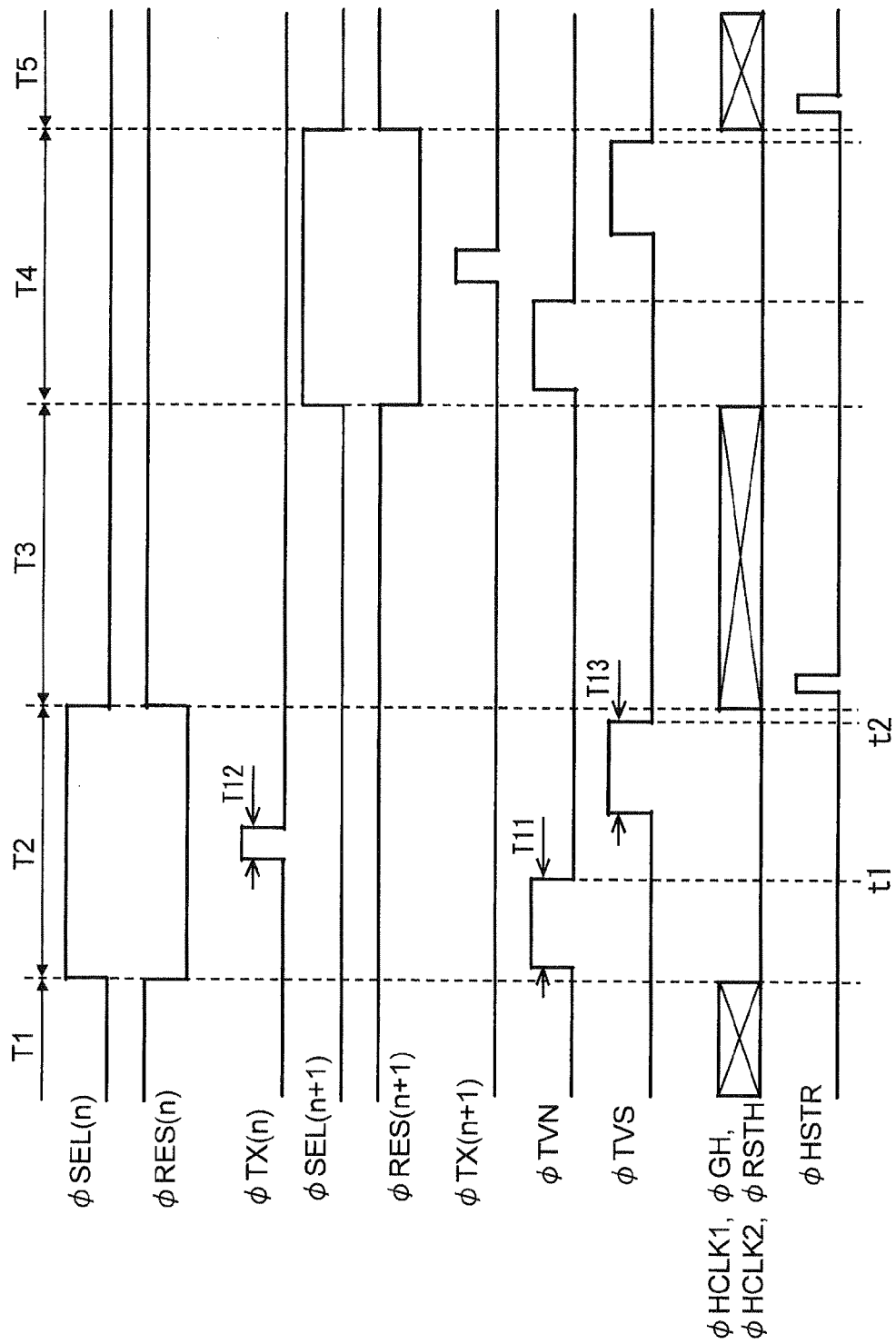
FIG. 6 is a timing chart showing a read operation of a solid state imaging device according to a second embodiment.

FIG. 6 is a timing chart showing a read operation of a solid state imaging device according to a second embodiment of the present invention. In FIG. 6, the same or corresponding elements as those in FIG. 3 are denoted by the same reference numerals, and an overlapping explanation thereof will be omitted.

The present embodiment is different from the aforementioned first embodiment in that the external control part 2 is structured to stop, during the entire horizontal blanking interval, the pulse signals φGH, φHCLK1, φHCLK2, φRSTH (in other words, to fix the signals to high level or low level), and to make, during the other intervals, each of the signals repeat at high frequency so that the signal is generated as the pulse signal.

Also in the present embodiment, the same advantages as those of the aforementioned first embodiment can be obtained. Note that it is needless to say that the operation regarding the horizontal scanning is performed without any problem even if the pulse signals φGH, φHCLK1, φHCLK2, φRSTH are stopped during the entire horizontal blanking interval as in the present embodiment.

While the respective embodiments of the present invention have been described above, the present invention is not limited to these embodiments.

For example, in the aforementioned first and second embodiments, all of the pulse signals φGH, φHCLK1, φHCLK2, φRSTH are stopped during the intervals T21, T22 or during the entire horizontal blanking interval, but, only any one, two, or three types of pulse signals among those pulse signals can be stopped. However, it is preferable to stop all of the pulse signals φGH, φHCLK1, φHCLK2, φRSTH in order to increase the image quality as much as possible.

Further, in the aforementioned respective embodiments, the light signal and the dark signal obtained by the vertical signal line 14 from the pixel 11 are directly accumulated in the accumulating capacitors CS, CN, respectively, but, it is also possible to structure such that the light signal and the dark signal obtained by the vertical signal line 14 from the pixel 11 are appropriately processed in a predetermined signal processing circuit (for instance, a circuit that performs amplification and correlated double sampling processing), and two signals obtained as a result of the processing (a signal including light information and a signal including a noise element to be subtracted from the signal) are accumulated in the accumulating capacitors CS, CN, respectively.

If such a signal processing circuit formed of two capacitors, one operation amplifier, and one transistor for reset is used, the vertical signal line 14 is coupled to an inverting input terminal of the operation amplifier via one of the two capacitors, a reference potential is applied to a noninverting input terminal of the operation amplifier, the other one of the two capacitors is coupled between an output terminal of the operation amplifier and the noninverting input terminal of the operation amplifier, and further, the transistor for reset is coupled between the output terminal of the operation amplifier and the noninverting input terminal of the operation amplifier. A reset control signal is given to a gate of the transistor for reset from the external control part 2 at a predetermined timing. At this time, the reset control signal is preferably stopped during the intervals T21, T22.

Further, although the aforementioned respective embodiments are structured to obtain the difference between the dark signal and the light signal in the external signal processing part 3, in the present invention, it is also possible to structure such that a differential amplifier is provided instead of the output amplifiers APS, APN and, with the use of the differential amplifier, the difference between the light signal of the light signal horizontal signal line 16S and the dark signal of the dark signal horizontal signal line 16N is output from the image sensor 1, for instance.

Further, it is also possible to mount the external control part 2 on the image sensor 1 in the aforementioned respective embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A solid state imaging device, comprising:
   a plurality of pixels being arranged two-dimensionally and performing a photoelectric conversion on an incident light;
   vertical signal lines provided to correspond to each column of the plurality of pixels and to which output signals of the pixels of the column corresponding thereto are supplied;
   a sampling hold part sampling and holding signals corresponding to signals of each of the vertical signal lines in accordance with sampling control signals, and supplying the signals being held to horizontal signal lines in accordance with a horizontal scanning signal;
   a horizontal scanning part supplying the horizontal scanning signal to the sampling hold part; and
   a horizontal drive controlling part supplying a plurality of types of pulse signals which relate in reading the signals supplied from the sampling hold part to the horizontal signal lines, wherein
   the horizontal drive controlling part stops one or more types of pulse signals among the plurality of types of the pulse signals during predetermined intervals including signal sampling timings which are determined by the sampling control signals.

2. The solid state imaging device according to claim 1, wherein
   the predetermined intervals correspond to local intervals in the vicinity of the signal sampling timings within a horizontal blanking interval.

3. The solid state imaging device according to claim 1, wherein
   the predetermined intervals correspond to one of an entire and a large part of a horizontal blanking interval.

4. The solid state imaging device according to claim 1, wherein
   one or more types of the pulse signals include at least one type of pulse signal which is supplied to the horizontal scanning part to make the horizontal scanning part generate the horizontal scanning signal.

5. The solid state imaging device according to claim 4, wherein:
   the horizontal scanning part includes a shift register part; and
   at least one type of the pulse signal includes driving clock signals which drives the shift register part.

6. The solid state imaging device according to claim 4, wherein:
   the horizontal scanning part includes a shift register part and a gate part which generates the horizontal scanning signal by gating output signals of respective stages of the shift register part in accordance with a gate control signal; and
   at least one type of the pulse signal includes the gate control signal.

7. The solid state imaging device according to claim 1, further comprising
   a horizontal signal line reset part resetting the horizontal signal lines to have a predetermined voltage in accordance with a horizontal line reset control signal, wherein
   one or more types of the pulse signals include the horizontal line reset control signal.

8. The solid state imaging device according to claim 1, wherein:
   each of the pixels includes one or more of switches which operate in accordance with pixel control signals; and
   the solid state imaging device further comprising
   a control unit supplying the pixel control signals to one or more of the switches, wherein
   the control unit stops the pixel control signals during the local intervals in the vicinity of the signal sampling timings within the horizontal blanking interval.

9. The solid state imaging device according to claim 1, wherein
   the sampling hold part has a light signal accumulating capacitor provided to correspond to each of the vertical signal lines and in which a light signal including light information on which the photoelectric conversion is performed in the pixels is accumulated, and a subtracting signal accumulating capacitor provided to correspond to each of the vertical signal lines and in which a subtracting signal including a noise element to be subtracted from the light signal is accumulated.

* * * * *